(12) United States Patent
Stoeger et al.

(10) Patent No.: US 10,602,579 B2
(45) Date of Patent: Mar. 24, 2020

(54) METHOD FOR REGULATING AN OPERATING CURRENT OF A LIGHTING UNIT AND CONTROL DEVICE AND MOTOR VEHICLE

(71) Applicant: CONTINENTAL AUTOMOTIVE GMBH, Hannover (DE)

(72) Inventors: Christian Stoeger, Vienna (AT); Emil Kovatchev, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/342,637

(22) PCT Filed: Oct. 17, 2017

(86) PCT No.: PCT/EP2017/076446
§ 371 (c)(1),
(2) Date: Apr. 17, 2019

(87) PCT Pub. No.: WO2018/073229
PCT Pub. Date: Apr. 26, 2018

(65) Prior Publication Data
US 2019/0246473 A1     Aug. 8, 2019

(30) Foreign Application Priority Data

Oct. 17, 2016   (DE) .................. 10 2016 220 198

(51) Int. Cl.
*H05B 33/08*    (2020.01)
*B60Q 1/076*    (2006.01)

(52) U.S. Cl.
CPC ......... *H05B 33/0845* (2013.01); *B60Q 1/076* (2013.01); *H05B 33/0848* (2013.01)

(58) Field of Classification Search
None
See application file for complete search history.

(56) References Cited

U.S. PATENT DOCUMENTS

| 7,259,522 B2 | 8/2007 | Toyota et al. |
|---|---|---|
| 9,287,247 B2 | 3/2016 | Faistauer |

(Continued)

FOREIGN PATENT DOCUMENTS

| DE | 10114124 A1 | 9/2002 |
|---|---|---|
| DE | 102008039530 A1 | 2/2010 |

(Continued)

*Primary Examiner* — Jany Richardson
(74) *Attorney, Agent, or Firm* — Laurence A. Greenberg; Werner H. Stemer; Ralph E. Locher

(57) ABSTRACT

A control device drives an operating current of a lighting unit formed with light emitting diodes. The lighting unit is connected to a contact pair of the control device. The control device sets at least one parameter of the operating current that depends on a diode type of the lighting unit. With the lighting unit switched off, the control device generates a measurement current and ascertains a measurement value to identify the diode type. A hysteretic regulator sets the parameter of the operating current, and a current source circuit sets a reference signal at a comparator during the operation of the lighting unit. With the lighting unit inactive, the current source circuit generates the measurement current. Alternatively, a precharge device of the control device charges an output capacitance at the contact pair by a predetermined precharge routine, and a deviation from a predetermined expected value is ascertained as the measurement value.

10 Claims, 2 Drawing Sheets

(56) References Cited

U.S. PATENT DOCUMENTS 9,544,970 B2     1/2017   Dunser et al.
2004/0090189 A1     5/2004   Yoneda et al.
2015/0373811 A1*   12/2015   Dunser .............. H05B 33/0815
                                                                   315/185 R

FOREIGN PATENT DOCUMENTS

| DE | 102012110397 A1 | 4/2014 |
| EP | 2741578 A1 | 6/2014 |
| EP | 2775796 A1 | 9/2014 |
| WO | 2014094016 A2 | 6/2014 |

* cited by examiner

METHOD FOR REGULATING AN OPERATING CURRENT OF A LIGHTING UNIT AND CONTROL DEVICE AND MOTOR VEHICLE

BACKGROUND OF THE INVENTION

Field of the Invention

The invention relates to a method for regulating an operating current of a lighting unit containing a light emitting diode arrangement. The lighting unit is supplied with the operating current by a control device. The invention also includes the control device for operating the lighting unit and a motor vehicle comprising the control device.

In a motor vehicle, by way of example, the vehicle headlights can comprise light emitting diodes as illuminants. In this case, here and hereinafter light emitting diodes should also be understood to mean laser diodes. A light emitting diode arrangement is generally provided in the form of an insert component comprising the light emitting diode arrangement itself and also a mechanical connection and electrical connection contacts. Here and hereinafter, said insert component is referred to as a lighting unit. Such a lighting unit can be connected to a control device which can supply the lighting unit with a regulated operating current.

Since light emitting diodes are constantly undergoing further development in order to improve their luminous intensities and/or luminous color fidelity, the control device has to be able, when a further developed or newly developed lighting unit is inserted, to adapt the operating current to the properties of the lighting unit. The control device thus has to know the necessary parameters for achieving the minimum brightness to be achieved by the lighting unit.

In order to ensure this with process reliability, i.e. to ascertain the correct parameter values with respect to a currently inserted new lighting unit in the control device, provision can be made for a digital memory containing the parameter values to be provided in the lighting unit itself, which memory can be read by the control device. A problem here is that this requires additional electrical connection contacts at the lighting unit and the control device, said contacts being necessary for the digital transmission. If corrosion occurs at such contacts in the course of operation of a control device, then the data transmission may be disturbed when a lighting unit is exchanged.

SUMMARY OF THE INVENTION

The invention is based on the object, in a control device provided for operating lighting units comprising light emitting diodes, of setting correct parameter values for the operating current of the lighting unit.

The object is achieved by means of the subjects of the independent patent claims. Advantageous developments of the invention are described by the dependent patent claims, the following description and the figures.

A first aspect of the invention provides a method for regulating the operating current of a lighting unit. The method is carried out by a control device and assumes that the lighting unit is connected to a contact pair of the control device, that is to say to two electrical contacts. The lighting unit comprises a light emitting diode arrangement which is operable via the contact pair. In other words, a cathode connection of the light emitting diode arrangement is electrically connected or respectively electrically linked to one of the electrical contacts, and an anode connection of the light emitting diode arrangement is electrically connected or respectively electrically linked to the second of the electrical contacts. The light emitting diode arrangement can be a single light emitting diode or a series circuit formed by a plurality of light emitting diodes.

For operating the light emitting diode arrangement, i.e. for generating light, the control device generates the operating current which flows via the contact pair. In the process the control device sets at least one parameter of the operating current depending on a diode type of the lighting unit. The diode type is the structural type of the light emitting diode. Possible parameters of the operating current are for example in each case a peak current and/or a basic pulse width of a pulse width modulation. As already explained, the at least one parameter of the operating current takes account of the diode type in order that the lighting unit is operated in accordance with a predefined specification, in order for example to provide the correct or desired brightness and/or luminous color.

In order then in the control device to set or to recognize what diode type is connected to the contact pair, and correspondingly to set the at least one parameter of the operating current provided for the diode type, provision is furthermore made for the control device, with the lighting unit switched off, that is to say when the light emitting diode arrangement thereof is inactive or dark or non-luminous, to generate a measurement current which flows through the lighting unit via the contact pair. Since the light emitting diode arrangement of the lighting unit is switched off, said measurement current does not flow through the light emitting diode arrangement itself. Instead, the measurement current flows through a part of an inner circuit of the lighting unit which is different than the light emitting diode arrangement. The control device thereupon identifies a measurement value of a predetermined measurement variable, for example of an electrical voltage which arises or is dropped between the contacts of the contact pair, said measurement value resulting on account of the measurement current. The control device thereupon identifies the diode type of the lighting unit on the basis of the ascertained measurement value.

This affords the advantage that without additional electrical contacts such as are required i.e. for transmitting digital information, the control device recognizes the diode type of the lighting unit solely via the electrical contacts of the contact pair. Thus, no additional electrical contacts are necessary. A further advantage thereof is that during operation of the lighting unit, that is to say when the light emitting diode arrangement is switched on or emits light, the operating current required for this typically has a magnitude such that corrosion of the electrical contacts of the contact pair is prevented. Consequently, even after a relatively long operating duration of the control device, it is ensured that the contact pair is free of corrosion and, consequently, after exchange of the lighting unit, the diode type thereof can be reliably ascertained.

In order to generate the measurement current, it is advantageous to use electronic components which are already present and which can also be used for the actual operation of the lighting unit, i.e. for providing the operating current for the light emitting diode to emit light. For this purpose, in accordance with a first variant, it is provided that for setting the at least one parameter of the operating current, a hysteretic regulator or hysteresis regulator (two-point regulator) is provided. Such a regulator monitors a current intensity of the operating current in relation to an upper threshold and a lower threshold, which differ by a delta value. In order to operate such a regulator, a reference signal for a comparator is generated, which reference signal signals or describes the present value of the switching threshold. Such a reference signal can be generated by means of a current source circuit. A hysteretic regulator with current source circuit for generating the reference signal for the comparator is then advantageously also used to generate the measurement current by means of the current source circuit with the lighting unit inactive. Consequently, the current source circuit is used for generating the reference signal during operation of the lighting unit (light emitting diode arrangement emits light) and for generating the measurement current with the lighting unit inactive (lighting unit does not emit light).

In accordance with a second variant, a further possibility for signaling the diode type provides for a precharge device of the control device to precharge an output capacitance which is effective at the contact pair by means of a predetermined precharge routine. Said output capacitance is independent of the lighting unit actually connected and is part of the control device. If a lighting unit is then connected, its internal electrical impedance (ohmic resistance and/or capacitive/inductive reactance, i.e. impedance) has an influence on the total value of the output capacitance which is effective at the contact pair. After carrying out or concluding the precharge routine, a deviation from a predetermined expected value can then be ascertained as measurement value. Consequently, it is likewise possible to ascertain what electrical variable is effective in addition to the device-inherent output capacitance at the contact pair.

The invention also includes optional developments whose features afford additional advantages.

Since the diode type can be ascertained via the contact pair itself, it is preferably provided that the lighting unit is electrically connected to the control device exclusively via the contact pair. This ensures that all electrical contacts used are kept free of corrosion as a result of the operating current of the light emitting diode arrangement or corrosion is at least reduced.

Said measurement current for ascertaining the measurement value is preferably generated exclusively in the case of an electrical voltage generated between the contacts of the contact pair, which electrical voltage results in an electrical voltage dropped across the light emitting diode arrangement which is smaller than a forward voltage of the light emitting diode arrangement. In other words, a corresponding electrical voltage is provided by which a light emitting diode arrangement interconnected with the contact pair is left inactive. Consequently, in the lighting unit it is not necessary for the electrical voltage at the light emitting diode arrangement to be kept low by a further electrical component, for example an electrical impedance, being connected upstream or downstream. This avoids power loss.

Preferably, said measurement variable whose measurement value is ascertained for identifying the diode type is an electrical voltage that results on account of a voltage drop across a coding element that is brought about by the measurement current. In this case, as already explained above, the current source circuit can be used for generating the measurement current. The coding element can be in particular a coding impedance, that is to say an electrical component having an ohmic resistance whose resistance value signals the diode type or is dependent on the diode type. In other words, lighting units of the same diode type have coding impedances having the same electrical impedance. Lighting units of different diode types also differ in the value of the coding impedance. The coding element is connected in parallel with the light emitting diode arrangement in the lighting unit. Consequently, the measurement current can flow through the coding element without an electric current thereby having to flow through the light emitting diode arrangement itself. In the case of an electrical impedance, a voltage drop arises for a given current intensity of the measurement current. The impedance value of the coding element can also be a complex impedance value, i.e. thus have besides an ohmic resistance value, in addition or as an alternative thereto, a capacitive or inductive reactance value. Such a coding element can also be provided as an impedance circuit which can comprise a plurality of electrical components.

Another way of electrically identifying a diode type is given by ascertaining as the measurement variable not the electrical voltage but rather a charging duration which results if, on account of a charging of an electrical coding capacitor that is brought about by the measurement current, a current intensity of the measurement current and/or a value of an electrical voltage bridg(es) a predetermined threshold value. Said charging duration is dependent on the capacitance value of the coding capacitor. In the lighting unit, the coding capacitor is then likewise connected in parallel with the light emitting diode arrangement in the manner described. In this regard, the diode type can be coded or signaled by means of an electrical capacitance whose capacitance value is dependent on the diode type. In this case, the current source circuit can in turn be used for generating the measurement current.

Provision is preferably made for the measurement current to have a set or predefined current intensity. For this purpose, the measurement current is generated by means of a constant-current source. In this regard, the charging duration of the capacitance or an electrical voltage across an electrical impedance can be ascertained as the measurement variable. The measurement current that flows in this case is then known in terms of its current intensity. An advantage here is that the light emitting diode arrangement is prevented from being destroyed on account of an excessively high measurement current. In particular, a protective resistor for the light emitting diode arrangement need not be provided in the lighting unit, which would otherwise lead to undesired electrical losses.

In order to be able to recognize the diode type in the control device on the basis of the measurement value, provision is made, for example, for ascertaining the diode type from the measurement value by means of an assignment table provided in the control device. This has the advantage that lighting units with a new diode type can also be taken into account by updating or altering the assignment table. With respect to each diode type, a respective parameter value can then be provided for the at least one parameter of the operating current.

In order to be able to carry out the method according to the invention, a further aspect of the invention provides a control device for operating at least one lighting unit. It should be noted that the method described can also be carried out for a plurality of lighting units, wherein each lighting unit can then be operated in a manner dependent on its diode type in the way described. In this case, the control device, for the purpose of connecting each lighting unit, comprises in each case a contact pair formed from two electrical contacts. Furthermore, the control device comprises an electronic current regulating circuit configured to provide an operating current for the respective lighting unit at each contact pair. In this case, the parameters of the operating current are set or adapted to the diode type of the lighting unit in the manner described, that is to say for example the pulse width of the pulse width modulation and/or the peak current intensity. In order to make this possible, the control device is configured to carry out an embodiment of the method according to the invention.

This control device is particularly advantageous in the case of use in a motor vehicle in order to operate a lighting installation of the motor vehicle. Here it is particularly advantageous to be able to exchange the lighting units without being dependent here on a diode type remaining the same continuously for years. Accordingly, a further aspect of the invention provides a motor vehicle comprising a lighting installation having an embodiment of the control device according to the invention. The motor vehicle according to the invention can be for example an automobile, such as a car or truck, for example.

A further element for implementing the aspects of the invention mentioned is the lighting unit itself, which independently signals its diode type, specifically at a contact pair via which the operating current is also received for the purpose of emitting light. For this purpose, the lighting unit comprises two connection contacts for connecting the lighting unit to the contact pair of a control device. The light emitting diode arrangement of the lighting unit is electrically connected between the two connection contacts. Consequently, the light emitting diode arrangement can be operated by adjustment of an operating current flowing via the contact pair. The lighting unit furthermore comprises a passive, electrical coding element for signaling a diode type of the lighting unit, said coding element being electrically connected between the connection contacts. In this case, the coding element is connected in parallel with the light emitting diode arrangement. Consequently, a measurement current can flow via the connection contacts and the coding element, without said operating current having to flow through the light emitting diode arrangement. In the case of the electrical coding element, passive is taken to mean that it acts as a passive electrical component, that is to say as ohmic resistance and/or capacitor and/or inductance. Generally, however, the coding element is an electrical impedance whose impedance value indicates the diode type.

The coding element is preferably a coding impedance or a coding capacitor.

BRIEF DESCRIPTION OF THE SEVERAL VIEWS OF THE DRAWING

An exemplary embodiment of the invention is described below. To that end, in the figures.

DESCRIPTION OF THE INVENTION

The exemplary embodiment explained below is a preferred embodiment of the invention. In the exemplary embodiment, the described components of the embodiment each constitute individual features of the invention which should be considered independently of one another and which in each case also develop the invention independently of one another and should thus also be regarded as part of the invention individually or in a different combination than that shown. Furthermore, the embodiment described is also able to be supplemented by further features of the invention from among those that have already been described.

In the figures, functionally identical elements are provided in each case with the same reference signs.

Figure 1:
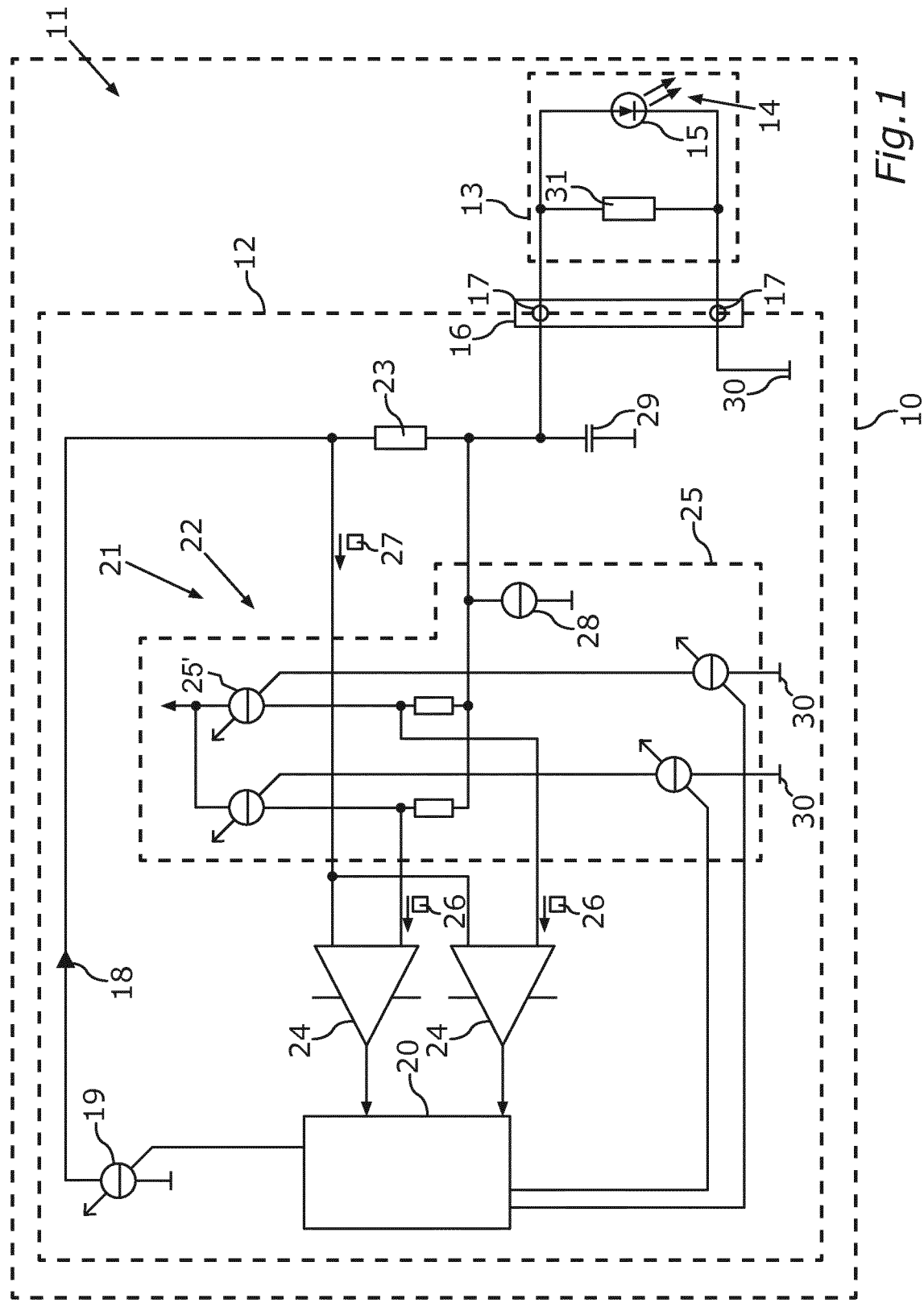
FIG. 1 shows a schematic illustration of an embodiment of the control device according to the invention during operation of a lighting unit.

FIG. 1 shows a motor vehicle 10 in a symbolized manner, which motor vehicle can be an automobile, for example. The motor vehicle 10 can comprise a lighting installation 11, by means of which a headlight of the motor vehicle 10 can be provided for illuminating the surroundings. The lighting installation 11 can comprise a control device 12, to which a lighting unit 13 can be connected. For the purpose of generating light 14, the lighting unit 13 can comprise a light emitting diode arrangement 15. The light emitting diode arrangement 15 can comprise a single light emitting diode or a plurality of light emitting diodes connected in series. Each light emitting diode can also be configured as a laser diode.

The lighting unit 13 can be connected to the control device 12 via a contact pair 16 composed of two electrical contacts 17. For the purpose of operating the lighting unit 13, that is to say in order that the light emitting diode arrangement 15 emits the light 14, the control device 12 can generate an operating current 18 which flows through the lighting unit 13 via the contacts 17. The operating current 18 can be provided by an operating current source 19. At least one parameter of the operating current 18, for example a period duration or a basic pulse width for a pulse width modulation (PWM) of the operating current 18 and/or a maximum current intensity of the operating current 18, can be regulated in this case.

What value the respective parameter of the operating current 18 must have can be set or ascertained by a logic circuit 20 of the control device 12 automatically or in an automated manner depending on a diode type of the lighting unit 13, i.e. on a design model or a configuration of the at least one light emitting diode of the light emitting diode arrangement 15. For this purpose, by means of the control device 12, the diode type can be ascertained via the contact pair 16 at the lighting unit 13 itself.

In the control device 12, for this purpose it is possible to use a current regulating circuit, or regulating circuit 21 for short, which is also used for adjusting the parameters of the operating current 18. For setting the parameters of the operating current 18, i.e. for regulating the operating current 18, the regulating circuit 21 has for example a hysteretic regulator 22 having a shunt resistor 23, comparators 24 and a current source circuit 25 having current sources 25' for providing a respective reference value 26 for each of the comparators 24 for a hysteresis regulation. Each current source 25' can be formed for example on the basis of a transistor and/or an operational amplifier. The comparators 24 compare the respective reference signal with a measurement signal 27 that is dependent on a current intensity value of the operating current 18.

Furthermore, a compensation current source 28 and a connection capacitance 29 are illustrated. The electric circuits are closed in each case via a ground potential 30.

Figure 2:
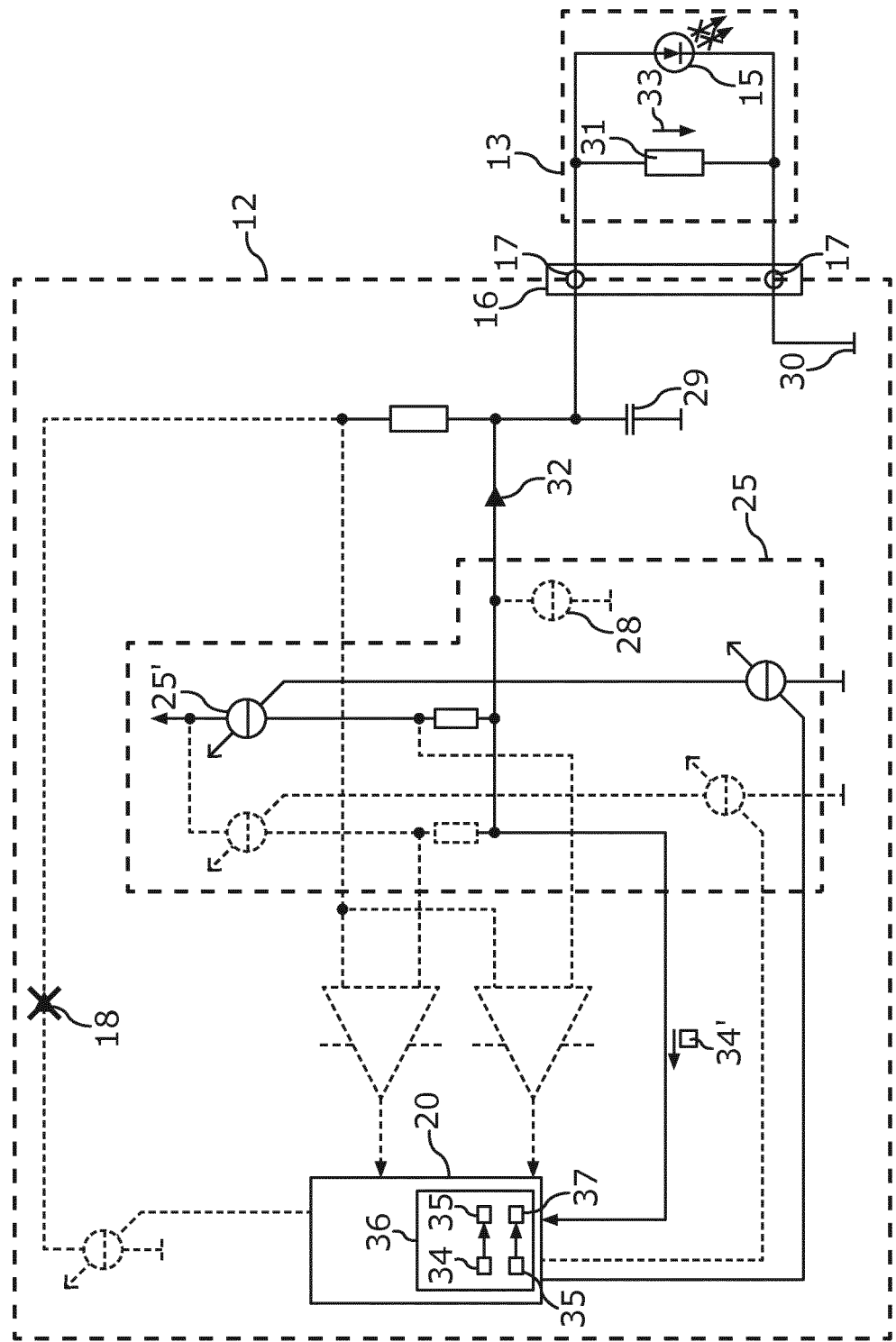
FIG. 2 shows a schematic illustration of the control device from FIG. 1 while the lighting unit is out of operation and a diode type of the lighting unit is ascertained or identified by means of an embodiment of the method according to the invention.

FIG. 2 illustrates how the diode type of the lighting unit 13 can also be ascertained by means of the regulating circuit 21. For this purpose, the lighting unit 13 comprises, connected in parallel with the light emitting diode arrangement 15, a coding impedance or a coding element 31, which can be for example an impedance element or an impedance component having an ohmic resistance value dependent on the diode type. With the operating current 18 switched off and with the compensation current source 28 switched off, a measurement current 32 can be provided at the contact pair 16 by means of one of the current sources 25' of the current source circuit 25.

Since the coding element 31 is connected in parallel with the light emitting diode arrangement 15 between the contacts 17, an electrical voltage 33 brought about by the measurement current 32 is dropped across the coding element 31, the measurement value 34 of which electrical voltage, via the current source circuit 25, is detected by the logic circuit 20 as measurement circuit 34' by means of an analog-to-digital converter, for example. The measurement value 34 can be assigned to a diode type 35, which can be carried out by means of an assignment table 36, for example. The diode type 35 can in turn be assigned at least one parameter value 37 for the respective parameter of the operating current 18. The regulating circuit 21 can then be configured on the basis of the at least one parameter value 37.

FIG. 2 also reveals that the output capacitance 29 also has to be charged by the current source 25'. Therefore, for coding purposes, in principle, a capacitance can also be used as coding element 31.

In the case of the control device 12, therefore, the particular advantage resides, then, in the following properties. There is no need for any separate electrical pins or contacts at the connector for the lighting unit 13, rather the contacts 17 can be used both for the operation of the light emitting diode arrangement 15 and for detecting or recognizing the diode type 35. In the case where the function of diode type recognition is integrated into an integrated circuit, such as a light emitting diode driver, for example, no additional circuit is necessary either, which is possible in particular by the use of the current source circuit 25 for generating the measurement current 32. Contact corrosion of the contacts 17 no longer poses a problem either, since the operating current 18 keeps the contacts 17 free of corrosion. In workshops, during headlight exchange, there is no need to give consideration to the parameterization of the operating current 18 in accordance with the new lighting unit 13, as a result of which, in particular, increased traffic safety is a major advantage.

The control device 12 thus solves two problems, namely contact corrosion and avoiding an increasing number of electrical contacts or connector pins. For this purpose, as coding element 31 a binning impedance or coding impedance is arranged in parallel with the light emitting diode arrangement 15. In order, during measurement by means of the measurement current 32, to prevent the light emitting diode arrangement 15 from emitting light while the diode type is being retrieved, the maximum attainable voltage 33 at the coding impedance must not be equal to or greater than the forward voltage of the light emitting diode arrangement 15, since the latter would then emit light. That means that only very low measurement currents 32 are used for this purpose. Finally, during normal operation with the light emitting diode arrangement 15 emitting light, by means of the coding impedance 31, a leakage current is also tapped off from the operating current 18. In this case, the coding impedance 31 is present in parallel during operation at the light emitting diode voltage, that is to say possibly also at 60 V, for example. That leads to the use of a high impedance value in order to keep down electrical losses at the coding impedance 31.

Furthermore, the operating current 18 provides for cleaning the contacts 17, that is to say prevents corrosion. It is thus always ensured that (apart from a few milliohms, which cannot make a variable contribution in comparison with the more than 1000 ohms, in particular more than 10000 ohms, of the coding impedance 31) the contact resistance of the contact pair 16 remains the same.

For a representative, exemplary calculation, it is possible to take as a basis the fact that with a predefined maximum power loss of 60 mW at the coding impedance 31 and with an operating voltage of 60 V, the impedance value R of the coding impedance 31 lies in the range $R=U^2/P$ equals 60 kohms or higher.

With a measurement current of 10 microamperes (as an example), 0.6 V is then dropped across that, which is still significantly below a forward voltage of a single light emitting diode. In order to be able to provide sufficiently different binning values or impedance values for differentiating between diode types, an expedient current of 5 microamperes or 10 microamperes results, such that light emitting diode chains or series circuits can be operated up to 60 V and the impedance values can be identified or measured by means of the measurement value 34.

A further configuration is possible by introducing a dedicated current source for charging the output capacitance instead of using the current source 25'.

Moreover, the contact pair 16 can be precharged to an expected value by means of a precharge routine with a fixedly predefined progression, in order to achieve a faster ascertainment of the capacitance value or impedance value of the coding element 31. The precharging can also be effected by a higher current, the maximum current of the comparator current source 25', or by the operating current source 19 for the operating current 18 itself.

Overall, the example shows how the invention makes it possible to provide a coding impedance measurement by means of comparator reference currents.

LIST OF REFERENCE SIGNS

10 Motor vehicle
11 Lighting installation
12 Control device
13 Lighting unit
14 Light
15 Light emitting diode arrangement
16 Contact pair
17 Electrical contact
18 Operating current
19 Operating current source
20 Logic circuit
21 Regulating circuit
22 Hysteretic regulator
23 Shunt resistor
24 Comparator
25 Current source circuit
25' Current source
26 Reference signal
27 Measurement signal
28 Compensation current source
29 Output capacitance
30 Ground potential
31 Coding element
32 Measurement current
33 Electrical voltage
34 Measurement value
34' Measurement signal
35 Diode type
36 Assignment table
37 Parameter value

The invention claimed is:

1. A method of controlling an operating current of a lighting unit by a control device, wherein the lighting unit is connected to a contact pair of the control device, the contact pair being formed of two electrical contacts, and the lighting unit has a light emitting diode arrangement that is operable via the contact pair, and the control device operates the light emitting diode arrangement by generating an operating current that flows via the contact pair, the method comprising:

providing the lighting unit with an electrical coding capacitor connected in parallel with the light emitting diode arrangement;

setting with the control device at least one parameter of the operating current depending on a diode type of the lighting unit; and generating, with the control device, a measurement current that flows through the lighting unit via the contact pair, and identifying, with the control device, the diode type based on a charging duration required for charging the electrical coding capacitor with the measurement current.

2. The method according to claim 1, wherein the lighting unit is electrically connected to the control device exclusively via the contact pair.

3. The method according to claim 1, which comprises generating an electrical voltage for the purpose of generating the measurement current between the contacts of the contact pair, said electrical voltage producing at the light emitting diode arrangement a voltage drop that is smaller than a forward voltage of the light emitting diode arrangement.

4. The method according to claim 1, which comprises generating the measurement current with a constant-current source.

5. The method according to claim 1, which comprises providing the control device with an assignment table and ascertaining the diode type from the measurement value by way of the assignment table provided in the control device.

6. The method according to claim 1, which comprises setting a pulse width of a pulse width modulation or a peak current intensity as the at least one parameter value of the operating current.

7. The method according to claim 1, which comprises setting a pulse width of a pulse width modulation and a peak current intensity as the parameter value of the operating current.

8. A control device for operating a lighting unit, the control device comprising:

a contact pair formed of two electrical contacts for connecting the lighting unit;

an electronic current regulating circuit configured to provide an operating current for the lighting unit at said contact pair; and wherein the control device is configured to carry out the method according to claim 1.

9. The control device according to claim 8, wherein said contact pair is one of a plurality of contact pairs each for connecting a respective lighting unit, and said electronic current regulating circuit is configured to provide an operating current for each respective lighting unit at each contact pair.

10. A motor vehicle, comprising a lighting installation with a control device according to claim 8.

* * * * *